Figure 1:
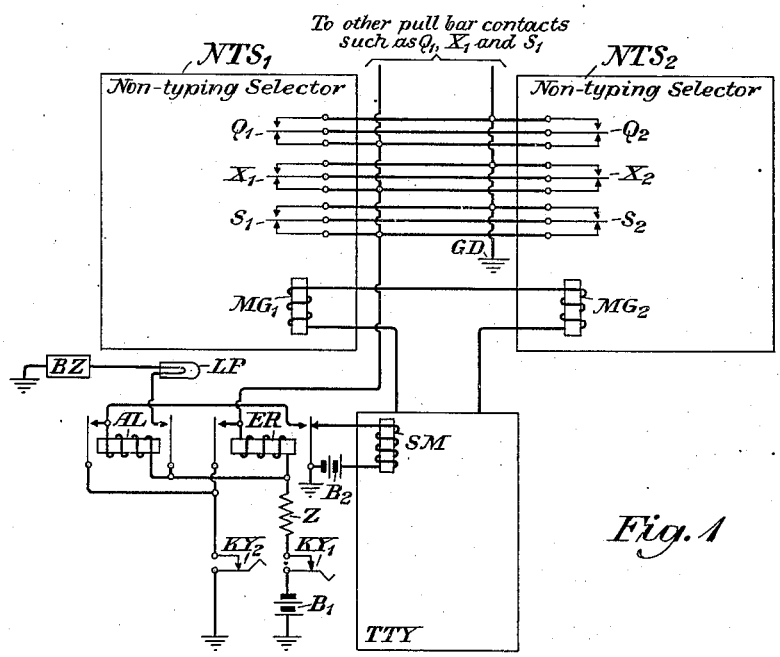

April 2, 1946.  A. R. EGGENSPERGER  2,397,848
TELETYPEWRITER CONTROL SYSTEM
Filed Nov. 5, 1943  2 Sheets-Sheet 1

INVENTOR
A. R. Eggensperger
BY
Jefferson Ehrlich
ATTORNEY

Patented Apr. 2, 1946

2,397,848

UNITED STATES PATENT OFFICE 2,397,848

TELETYPEWRITER CONTROL SYSTEM

Arlo Raleigh Eggensperger, Chicago, Ill., assignor to American Telephone and Telegraph Company, a corporation of New York Application November 5, 1943, Serial No. 509,057

12 Claims. (Cl. 178—69)

This invention relates to telegraph systems. More particularly, this invention relates to teletypewriter systems and to circuits employing non-typing selectors. Still more particularly, this invention relates to apparatus for testing teletypewriters and non-typing selectors.

In teletypewriter systems a modified form of teletypewriter, known as a non-typing selector, is often used for switching or control purposes. Such a non-typing selector may be a teletypewriter of any well-known type having its typing mechanism removed or strapped so as to be inoperative. Such a non-typing selector may be employed to switch a transmitting teletypewriter, for example, first to one receiving teletypewriter, then to another teletypewriter, and so on. The non-typing selector includes, among other things, an operating magnet and its associated selective elements, together with a plurality of pull-bar contact assemblies, each of which may be selected by the magnet in response to a separate and distinct teletypewriter character such as Q, X, S, etc. When the character Q is received by the non-typing selector, the corresponding pull-bar assembly will be selected to switch the transmitting teletypewriter to one of the receiving teletypewriters; and when the character X is received by the non-typing selector, it will then switch the transmitting teletypewriter to another receiving teletypewriter, and so on. If the non-typing selector selects the wrong pull-bar assembly, the transmitting teletypewriter will be connected to a receiving teletypewriter which is different from the one intended and this will, of course, result in error and confusion. As the non-typing selector makes no record of its operations, it is often difficult, if not impossible, to determine whether the non-typing selector is in proper operation.

According to the invention it is proposed to provide apparatus for testing a non-typing selector to determine whether or not it is in proper operating condition. According to one embodiment of the invention, a second non-typing selector will be connected to the non-typing selector to be tested so that when the first-mentioned non-typing selector selects a pull-bar assembly in error, or fails to select the desired pull-bar assembly, the error will be promptly indicated.

Stated somewhat differently, an object of this invention is to connect two non-typing selectors to a transmitter-distributor, or other source of teletypewriter character signals, so that when an error occurs in the selection of the pull-bar assemblies of either of the non-typing selectors, an indication will be promptly obtained of that condition. In accordance with the invention the operating circuit of the transmitter-distributor or other source of teletypewriter signals will be opened as soon as the error appears, whereupon transmission to the non-typing selectors will be interrupted.

Stated somewhat more differently, an object of this invention is to connect the contacts of two or more identical non-typing selectors in parallel so that the contacts of all of the non-typing selectors may respond equally to the signals or characters received from a source of teletypewriter signals or characters. As soon as one of the non-typing selectors operates a different pull-bar or assembly from those operated by all of the other non-typing selectors, the source of teletypewriter signals or characters will be immediately disconnected so that the error may be observed.

Figure 3:
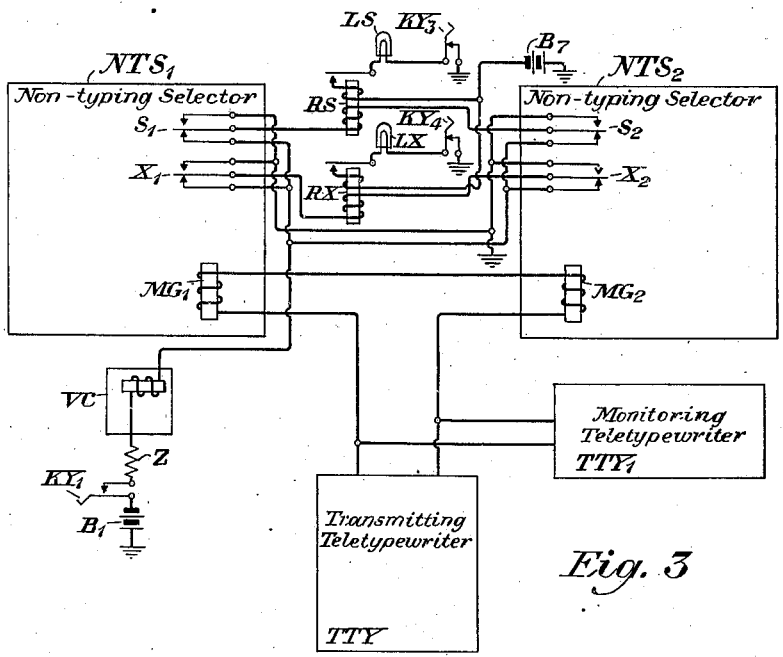
Figure 2:
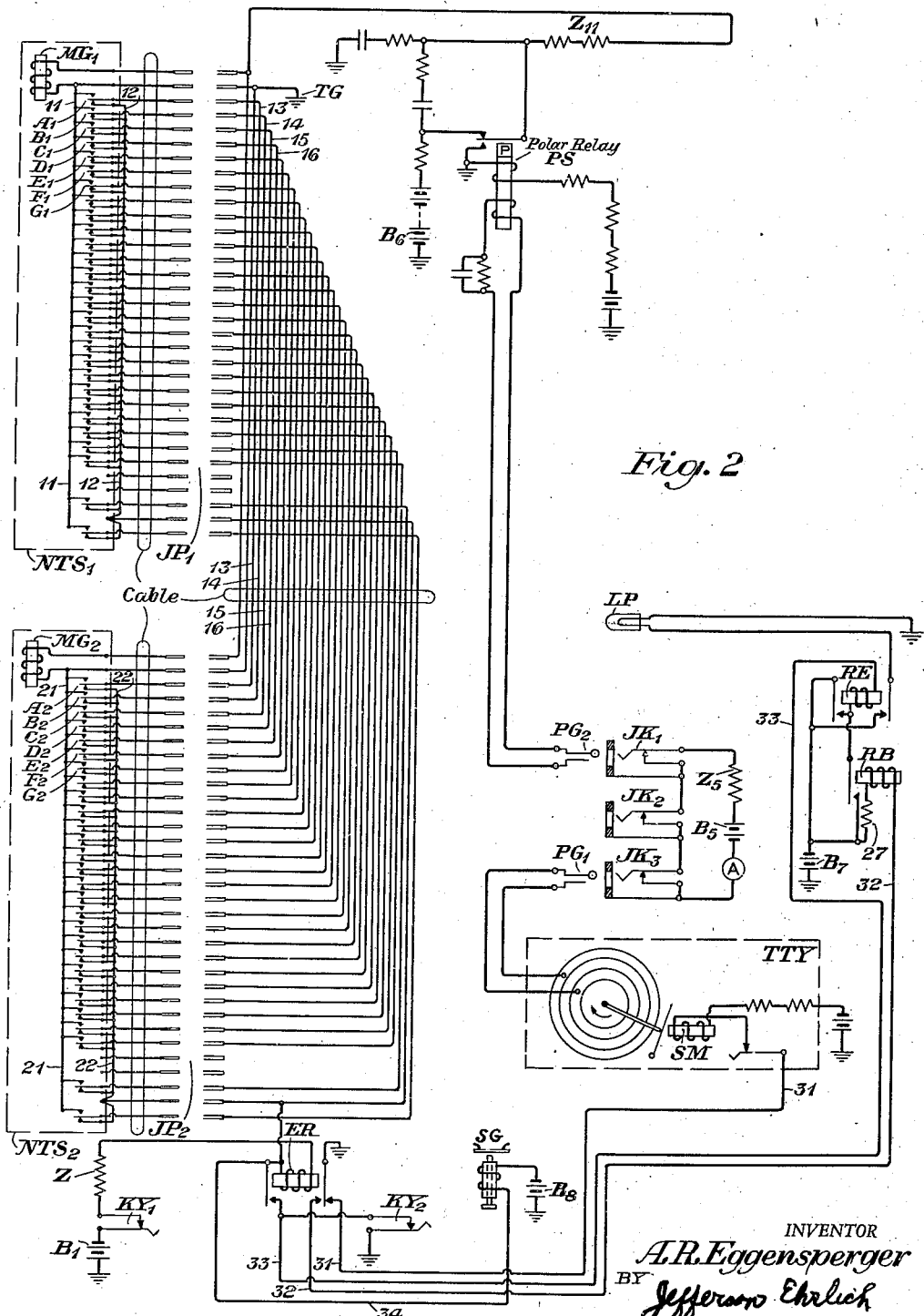

This invention will be better understood from the more detailed description hereinafter following, when read in connection with the accompanying drawings, in which Figure 1 illustrates schematically the features involved in the invention; Fig. 2 illustrates a more detailed arrangement according to the invention; and Fig. 3 shows a somewhat different embodiment of the invention.

Referring to Fig. 1 of the drawings, the reference characters NTS₁ and NTS₂ designate two non-typing selectors and the reference character TTY designates a teletypewriter transmitter-distributor or other source of teletypewriter signals or characters. The transmitter-distributor TTY is shown connected to the operating magnets MG₁ and MG₂ of the two non-typing selectors NTS₁ and NTS₂, respectively. Each magnet controls a plurality of pull-bar contact assemblies, only three of which are here shown merely for illustrative purposes. The three contact assemblies controlled by the magnet MG₁ of the non-typing selector NTS₁ are designated Q₁, X₁ and S₁, and the corresponding pull-bar assemblies controlled by the magnet MG₂ of the non-typing selector NTS₂ are designated Q₂, X₂ and S₂. Each pull-bar contact assembly includes a swinger and two contacts on opposite sides of the swinger, one of the contacts—the lower contact—being normally closed by the swinger, the other or upper contact of the swinger being closed only upon the proper operation of the associated magnet in response to an appropriate teletypewriter signal or character received from teletypewriter transmitter-distributor TTY. The swingers of the pull-bar assemblies $Q_1$, $X_1$ and $S_1$ are connected to the corresponding swingers of the pull-bar assemblies $Q_2$, $X_2$ and $S_2$, as shown in the drawings. The upper contacts of the various pull-bar assemblies are connected to each other and are all grounded at GD. The lower contacts of the various pull-bar assemblies are all connected to each other and are also wired to a circuit which includes the winding of a relay ER, a resistor Z, a start key $KY_1$, battery $B_1$ and ground.

When the teletypewriter transmitter-distributor TTY is not transmitting signals or characters to the non-typing selectors $NTS_1$ and $NTS_2$, the magnets $MG_1$ and $MG_2$ of these selectors will cease operating. The upper contacts of all the pull-bar assemblies, although grounded, will be disconnected from the circuit of relay ER due to the fact that none of the swingers has closed its upper contact. Relay ER will be operated only when one of the swingers of one of the non-typing selectors such as $NTS_1$ has closed its upper contact while the corresponding swinger of the other non-typing selector remains closed against its lower contact. This will now be explained.

When the teletypewriter transmitter-distributor TTY transmits a teletypewriter character, such as Q, to the non-typing selectors $NTS_1$ and $NTS_2$, the magnets $MG_1$ and $MG_2$ of these two machines will be energized in a well-known manner to operate the pull-bar contact assemblies $Q_1$ and $Q_2$, for example, to move the swingers of these contact assemblies to their respective upper contacts. A different teletypewriter character, such as X, received from the teletypewriter transmitter-distributor TTY will operate the pull-bar contact assemblies $X_1$ and $X_2$, for example, causing the swingers of these contact assemblies to close their respective upper contacts. A third teletypewriter character, such as S, will likewise cause the swingers of the contact assemblies $S_1$ and $S_2$ to close their respective upper contacts. But when the teletypewriter character Q, for example, is received, then if the swingers of the assemblies $Q_1$ and $Q_2$ close their respective upper contacts, the circuit of relay ER will remain deenergized. The ground GD is then connected to the upper contacts and to the corresponding swingers of the assemblies $Q_1$ and $Q_2$, but the circuit of relay ER will be opened at the lower contacts of the assemblies $Q_1$ and $Q_2$. Consequently, relay ER will remain unoperated if the swingers of both contact assemblies $Q_1$ and $Q_2$ close their respective upper contacts at about the same time. Similarly, relay ER will remain de-energized if, in response to a character X, the swingers of the assemblies $X_1$ and $X_2$ simultaneously close their respective upper contacts. And so on for each of the other contact assemblies.

Thus it will be observed that if any two corresponding swingers of the two non-typing selectors synchronously close their upper contacts, the relay ER will remain unoperated. Relay ER will become operated whenever the swingers of the selectors depart from their synchronous relationship, as will now be explained.

If the teletypewriter transmitter-distributor TTY transmits the character X, for example, and this causes the swinger of the assembly $X_1$ of the non-typing selector $NTS_1$ to close its upper contact, but the swinger of the assembly $S_2$ of the non-typing selector $NTS_2$ closes its upper contact, the relay ER will become operated. The circuit causing relay ER to operate will include battery $B_1$, key $KY_1$, resistor Z, the winding of relay ER, the lower contact and swinger of assembly $S_1$, the swinger and upper contact of assembly $S_2$, and ground GD. A parallel path for the winding of relay ER over the contact assemblies will include the lower contact and swinger of assembly $X_2$, the swinger and upper contact of assembly $X_1$ and ground GD.

The operation of relay ER will then open the circuit to the starting magnet SM of teletypewriter transmitter-distributor TTY at the back contact of the armature at the right of relay ER and hence cause the teletypewriter transmitter-distributor TTY to cease transmitting any additional characters. The make contact of the armature at the right of relay ER will complete a circuit to operate a relay AL, the completed circuit including battery $B_1$, start key $KY_1$, resistor Z, the winding of relay AL, the make contact and right armature of relay ER and ground. The operation of the relay AL will cause the lamp LP to be lighted and the buzzer BZ to be operated, the circuit controlling these indicating devices including battery $B_1$, key $KY_1$, resistor Z, right armature and make contact of relay AL, lamp LP, buzzer BZ and ground. At the same time both relays ER and AL will be locked in their operated positions. The locking circuit for relay ER includes, in addition to battery $B_1$, key $KY_1$ and resistor Z, the winding of relay ER, its left armature and make contact, the release key $KY_2$ and ground. The locking circuit for relay AL includes, in addition to battery $B_1$, key $KY_1$ and resistor Z, the winding of relay AL, its left armature and make contact, the release key $KY_2$ and ground. Thus the lamp LP and the buzzer BZ will be operated and held operated and the starting magnet SM of the teletypewriter transmitter-distributor TTY will be released and held released immediately after an error occurs in either of the non-typing selectors $NTS_1$ and $NTS_2$.

The operator then knows that one of the non-typing selectors $NTS_1$ or $NTS_2$ is operating in error and can observe which one of the contact assemblies is operating in error in response to the character X received from the transmitter-distributor TTY. In the case just referred to, an inspection by the operator will detect that the contact assembly $S_2$ was wrongly operated but that the contact assembly $X_2$ should have been operated in its stead. The operator may then adjust or repair the mechanism for proper operation.

The operator may then operate his release key $KY_2$ to release the relays ER and AL. The release of relay AL will extinguish the lamp LP and stop the buzzer BZ. The release of relay ER will reconnect the starting magnet SM of teletypewriter transmitter-distributor TTY to its battery $B_2$, thereby permitting the teletypewriter transmitter-distributor TTY to continue to transmit signals to both of the non-typing selectors $NTS_1$ and $NTS_2$ as before.

It will be observed that the relay ER will be operated somewhat slowly when the swinger of any one of the various contact assemblies, such as $S_2$, has properly closed its upper contact in response to the character S, while the swinger of the corresponding contact assembly $S_1$ has failed to close its upper contact simultaneously. Hence the mechanism will indicate an error such as may be caused by one of the non-typing selectors responding properly to a predetermined character at a time when the other non-typing selector fails to respond to that character.

Although two non-typing selectors are coupled to each other and to a teletypewriter for observing the operation of these non-typing selectors, it will be clear that three or more non-typing selectors may be similarly coupled to each other to compare their operations.

The apparatus of this invention serves to determine whether or not a non-typing selector, such as $NTS_1$, is operating properly. The invention resides essentially in paralleling the swinger contacts of the pull-bar assemblies of the non-typing selector $NTS_1$ to the swinger contacts of the pull-bar assemblies of another non-typing selector, such as $NTS_2$. This provides an indication when the selector $NTS_1$ fails to operate properly and at the same time interrupts the transmission of teletypewriter characters to the two non-typing selectors. It will be seen that the non-typing selectors $NTS_1$ and $NTS_2$ may be teletypewriters of any well-known type or any selector mechanisms controlling moving elements. If the two non-typing selectors are replaced by two teletypewriters, the apparatus of the invention may be employed to determine whether the pull-bar assemblies of the two teletypewriters are operating properly and in synchronism, or whether the printing mechanism of the two teletypewriters are operating properly and in synchronism.

Fig. 2 shows in greater detail the equipment that is used to practice the invention shown schematically in Fig. 1. Here the non-typing selectors $NTS_1$ and $NTS_2$ include their respective magnets $MG_1$ and $MG_2$. The magnet $MG_1$ controls pull-bar contact assemblies $A_1$, $B_1$, $C_1$, $D_1$, and so on (in a manner well understood in the teletypewriter art), and magnet $MG_2$ similarly controls the corresponding pull-bar assemblies $A_2$, $B_2$, $C_2$, $D_2$, and so on. The upper contacts of the swingers of the assemblies $A_1$, $B_1$, $C_1$, $D_1$, . . . of the non-typing selector $NTS_1$ are connected to each other by a conductor 11 while the corresponding upper contacts of the pull-bar assemblies of the non-typing selector $NTS_2$ are connected to each other by conductor 21. The lower contacts of the pull-bar assemblies of the selector $NTS_1$ are multipled to each other by a conductor 12 and the corresponding lower contacts of the selector $NTS_2$ are multipled to each other by a conductor 22. A multi-pronged plug and jack arrangement $JP_1$ is employed to connect the equipment of the non-typing selector $NTS_1$ to the other elements of the system and a similar multi-pronged plug and jack arrangement $JP_2$ connects the equipment of the non-typing selector $NTS_2$ to the rest of the system. It will be observed that the plug and jack arrangement $JP_1$ embodies a plurality of contacts, the upper two of which connect the magnet $MG_1$ between the armature of the polar relay PS and ground at TG, the connection to armature of polar relay PS being established through a resistor $Z_{11}$. The plug and jack arrangement $JP_2$ establishes a similar circuit at its upper two contacts for connecting the magnet $MG_2$ between the armature of polar relay PS and ground. The remaining contacts of the two plug and jack arrangements $JP_1$ and $JP_2$ are connected to each other by individual circuits, the conductor 13 connecting the swinger of the pull-bar assembly $A_1$ to the swinger of the pull-bar assembly $A_2$, the conductor 14 connecting the swinger of pull-bar assembly $B_1$ to the swinger of the pull-bar assembly $B_2$, the conductor 15 connecting the swinger of pull-bar assembly $C_1$ to the swinger of the pull-bar assembly $C_2$, and so on.

The apparatus of Fig. 2 also includes three jacks $JK_1$, $JK_2$ and $JK_3$, the contacts of which are connected in series with each other and in series with a resistor $Z_5$ and battery $B_5$. The resistor $Z_5$ is of such a magnitude that current of a predetermined magnitude, such as 60 mag., will flow through the circuit. The transmitter-distributor TTY, or other source of test signals, is terminated in a plug $PG_1$. The plug $PG_1$ may be inserted into any one of the three jacks, such, for example, as jack $JK_3$. Another plug $PG_2$, which is connected to the main or operating winding of a polar relay PS, may be inserted into another one of the jacks such as $JK_1$. Pulses of current will be transmitted from the transmitter-distributor TTY in accordance with the characters to be transmitted and these will cause the flow of current from battery $B_5$ through resistor $Z_5$ to be correspondingly interrupted, these interruptions being communicated to the main winding of relay PS. The upper winding of relay PS is merely the usual biasing winding. A teletypewriter (not shown) may be connected to jack $JK_2$ and employed for monitoring purposes.

The winding of relay ER is connected to battery $B_1$ through resistor Z and the contacts of key $KY_1$. But relay ER will be unoperated if none of the swingers of the various pull-bar assemblies $A_1$, $B_1$, $C_1$, etc., and the corresponding swingers of the pull-bar assemblies $A_2$, $B_2$, $C_2$, etc., are in their normal or lower positions. Relay ER will be operated only when the pull-bar assemblies of the two non-typing selectors $NTS_1$ and $NTS_2$ operate differently in response to any teletypewriter character received from teletypewriter transmitter-distributor TTY or when one of the swingers of one of the selectors closes its upper contact while the corresponding swinger of the other selector fails to close its upper contact simultaneously, as will now be shown.

Assume that the transmitter-distributor TTY is supplied with tape perforated according to a plurality of different characters which are to be transmitted to the non-typing selectors $NTS_1$ and $NTS_2$. If the first character is C, for example, the circuit of battery $B_5$ and resistor $Z_5$ will be interrupted in accordance with the marking and spacing pulses composing the character C, and hence the polar relay PS will be operated and released to transmit these pulses to the operating magnets $MG_1$ and $MG_2$ of the non-typing selectors $NTS_1$ and $NTS_2$, respectively. When a marking pulse is transmitted to the operating winding of the polar relay PS, its armature will be released to operate both magnets $MG_1$ and $MG_2$. These magnets will be operated because both terminals of each winding of the magnets $MG_1$ and $MG_2$ will be grounded. During a spacing pulse, on the other hand, the armature of the polar relay PS will be operated and hence no current will flow from battery $B_6$, through the back contact and armature of the relay PS, and then through resistor $Z_{11}$ to the windings of both magnets $MG_1$ and $MG_2$ to ground at TG. Thus the magnets $MG_1$ and $MG_2$ will be repeatedly energized and released in this manner to cause the swingers of the selected pull-bar assemblies $C_1$ and $C_2$ to close their upper contacts. The simultaneous closure of the upper contacts of the pull-bar assemblies $C_1$ and $C_2$ will not complete the circuit to relay ER and relay ER will remain non-operated. In this regard it will be observed that in response to the character C, the swinger of the pull-bar assembly $C_1$ is connected by conductor 11 to ground at TG and that the swinger of the pull-bar assembly $C_2$ is likewise connected to ground at TG by conductors 21, 15 and 11. However, the ground at TG is not communicated to the left-hand terminal of the winding of relay ER due to opening of the circuit between the swinger of assembly $C_1$ and conductor 12 and to the opening of the circuit between the swinger of assembly $C_2$ and conductor 22. The non-synchronous movement of the swingers of assemblies $C_1$ and $C_2$ will fail to operate relay ER.

If the transmission of the character C from the transmitter-distributor TTY to the non-typing selectors $NTS_1$ and $NTS_2$ causes the swinger of the pull-bar assembly $C_1$ to close its upper contact in the usual manner but fails to cause the swinger of the corresponding pull-bar assembly $C_2$ to close its upper contact, the relay ER will then be operated. The circuit causing relay ER to operate will include battery $B_1$, key $KY_1$, resistor Z, the winding of relay ER, the conductor 22 (which interconnects the lower contacts of the pull-bar assemblies of the selector $NTS_2$), the lower contact and swinger of pull-bar assembly $C_2$, conductor 15, the swinger and upper contact of the pull-bar assembly $C_1$, conductor 11, and ground at TG. The operation of relay ER will then perform a number of functions, which will now be pointed out.

Upon the opening of the back contact of the right armature of relay ER, ground will be removed from the conductor 31 which extends to the starting magnet SM of the transmitter-distributor TTY, and hence the transmitter-distributor TTY will cease to transmit further signals or characters as will be understood by those skilled in the art. The closure of the make contact of the right armature of relay ER will cause relay RB to operate, the circuit for which includes battery $B_7$, resistor $Z_7$, the winding of relay RB, the make contact and right armature of relay ER and ground. The operation of relay RB will complete a circuit to operate the relay RE, this circuit including battery $B_7$, the armature and make contact of relay RB, the winding of relay RE, conductor 33, releases key $KY_2$ and ground. Relay RE will then be locked in its operated position through key $KY_2$. Moreover, relay ER will be locked in its operating position, the locking circuit including battery $B_1$, the key $KY_1$, resistor Z, the winding of relay ER, the left armature and make contact of relay ER, key $KY_2$ and ground. The operation of relay RE will cause the lamp LP to be illuminated, the circuit to lamp LP including battery $B_7$, the right armature and make contact of relay RE, the lamp LP and ground. Furthermore, the signal gong SG will be operated, the operating circuit for which includes battery $B_8$, the winding of the signal gong SG, conductor 34, the left armature and make contact of relay ER, the release key $KY_2$ and ground. The lamp LP and the signal gong SG will signify to the operator that an error has occurred in the operation of one of the two non-typing selectors $NTS_1$ and $NTS_2$ and that this requires attention. These signaling devices will remain operated until keys $KY_1$ or $KY_2$ are subsequently operated.

It was explained that relay ER will operate if, in response to a character such as C, the swinger of the pull-bar assembly $C_1$ closes its upper contact while none of the swingers of the pull-bar assemblies of the selector $NTS_2$ close their upper contacts. The relay ER will also be operated if the swinger of pull-bar assembly $A_2$ of selector $NTS_2$ erroneously closes its upper contact in response to the character C. The circuit for operating relay ER will be the same as already described, but now there will be a second operating circuit through the swinger of assembly $A_2$. This additional circuit will include battery $B_1$, key $KY_1$, resistor Z, the winding of relay ER, conductor 22, the swinger and upper contact of assembly $A_2$, conductor 21, to ground at TG. Thus any non-synchronous operation of the pull-bar assemblies will actuate relay ER.

The apparatus may be returned to its normal or non-operated position by depressing the release key $KY_2$. This will also cause the transmitter-distributor TTY to continue the transmission of characters.

The monitoring teletypewriter (not shown), which was inserted into jack $JK_2$, may be employed for the purpose of exhibiting the characters of the perforated tape of the transmitter-distributor TTY transmitted to the non-typing selectors. The operation of relay ER in response to the occurrence of an error will permit the operator to observe on the monitoring teletypewriter the particular characters that caused the failure.

Fig. 3 shows schematically a somewhat different arrangement for comparing the operation of two (or more) non-typing selectors. Here the non-typing selectors $NTS_1$ and $NTS_2$ are similarly connected to the common transmitting teletypewriter transmitter-distributor TTY. A monitoring teletypewriter, designated $TTY_1$, may also be connected to the teletypewriter TTY to aid the operator in detecting the characters that cause failures of the non-typing selectors.

In Fig. 3 the swinger of the contact assembly $S_1$ is connected to the swinger of the contact assembly $S_2$ through one of the windings of a relay RS, the other winding of which may be connected to a lamp LS. Similarly, the swinger of the contact $X_1$ is connected to the swinger of the contact assembly $X_2$ through the winding of a relay RX, the other winding of which may be connected to a lamp LX.

When the transmitter-distributor TTY transmits a character, such as S, which causes the swinger of the pull-bar assembly $S_1$ to close its upper contact and at the same time causes the swinger of the contact assembly $X_2$ to erroneously close its upper contact, both of the relays RX and RS will be operated. The circuit causing relay RS to operate will include battery $B_1$, key $KY_1$, resistor Z, the counter VC, the lower contact and swinger of the assembly $S_2$, the lower winding of relay RS, the swinger and upper contact of assembly $S_1$, and ground. The circuit to operate relay RX will include battery $B_1$, key $KY_1$, resistor Z, counter VC, the lower contact and swinger of assembly $X_1$, the lower winding of relay RX, the swinger and upper contact of assembly $X_2$, and ground. The relays RS and RX will be locked in their operated positions. The locking circuit for relay RS includes battery $B_7$, the upper winding of relay RS, the armature and make contact of relay RS, lamp LS, key $KY_3$ and ground. The locking circuit for relay RX will include battery $B_7$, the upper winding of relay RX, the armature and make contact of relay RX, the lamp LX, key $KY_4$ and ground. The operator will note from the monitoring teletypewriter $TTY_1$ which one of the characters S or X causes the relays RS and RX to become operated and locked. The counter VC will serve to indicate the number of times that errors have occurred in the non-typing selectors.

The relays RS and RX may be released by opening the keys KY₃ and KY₄, and the operation of these keys will also extinguish the lamps LS and LX, respectively.

The arrangement of Fig. 3 as thus described will not cause the transmitter-distributor TTY to cease its operations upon the occurrence of an error in either of the non-typing selectors. If it is desired to halt the operation of the transmitter-distributor TTY, this may be accomplished by merely adding another armature to either of the relays RS and RX (in the manner of Fig. 2) to open the circuit of the starting magnet of the teletypewriter TTY in response to the operation of the relay so modified. This modification will be obvious from Fig. 2 and therefore has not been shown. It will be apparent also that if no error occurs in the operation of either of the non-typing selectors, relays RS and RX will remain unoperated and the lamps LS and LX extinguished.

While this invention has been shown and described in certain particular embodiments merely for the purpose of illustration, it will be understood that the general principles of this invention may be applied to other and widely varied organizations without departing from the spirit of the invention as defined in the appended claims.

What is claimed is:

1. The combination of a teletypewriter transmitter-distributor, two non-typing selectors connected to said transmitter-distributor, each non-typing selector having a plurality of selectable contacts each of which corresponds to and is selected in response to a different teletypewriter character received from said transmitter-distributor, and means interconnecting the contacts of both non-typing selectors to indicate that one of the non-typing selectors is selecting a different contact from that selected by the other non-typing selector.

2. The combination of a transmitter-distributor transmitting teletypewriter character signals, a plurality of non-typing selectors connected to said transmitter-distributor so as to respond simultaneously to the same teletypewriter character signals received from said transmitter-distributor, and means interconnecting all of said selectors and responsive to a failure by one of said selectors to respond properly to a received teletypewriter character signal to cause said transmitter-distributor to stop operating.

3. The combination of a source of teletypewriter signals, a plurality of non-typing selectors connected to said source of signals so as to respond equally to signals from said source, and means connected in common to all of said selectors and responsive to the failure of one of said selectors to selectively respond properly to any signal from said source to cause said source to stop sending signals.

4. The combination of a plurality of selector devices each of which includes a plurality of elements which may be separately selected, a source of teletypewriter signals connected to said selector devices to select a predetermined element in each of said selector devices simultaneously, and means interconnecting the elements of said selector devices to indicate a failure in the proper selection of one of said elements of said selector devices.

5. The combination of a plurality of substantially equal selector devices each having a plurality of elements which may be separately selected by different signals, means for supplying signals to said selector devices to selectively operate the corresponding elements of said selector devices simultaneously, the elements of said selector devices being connected in parallel with each other, and means connected to the parallel circuit of said elements to indicate that said elements are not responding simultaneously to said signals.

6. The combination of a teletypewriter transmitter-distributor transmitting teletypewriter characters, a first non-typing selector connected to said transmitter-distributor, and means to indicate the failure of said first non-typing selector to respond properly to said teletypewriter characters and at the same time to halt said transmitter-distributor, said means comprising a second non-typing selector connected also to said transmitter-distributor, a control circuit connected in common to both non-typing selectors to indicate the failure of said first non-typing selector, and means responsive to the operation of said control circuit to interrupt the operation of said transmitter-distributor.

7. The combination of a single source of teletypewriter characters, two non-typing selectors connected to each other and to said source so as to respond equally to received teletypewriter characters, both non-typing selectors having a plurality of elements which are connected in parallel to each other and are selectively operated by the received teletypewriter characters, and means controlled by said parallel circuit and responsive to the failure of both non-typing selectors to respond equally to a teletypewriter character to indicate said failure.

8. The combination of two non-typing selectors, a source of teletypewriter signals connected to both of said selectors, each of said selectors including a plurality of pull bars which are equally operable by different predetermined teletypewriter signals received from said source, and means connected to the pull bars of both of said selectors for indicating the failure of the pull bars of both of said selectors to operate equally.

9. The combination of a source of pulses corresponding to teletypewriter signals, a plurality of machines connected to said source, each machine having a magnet and a bar which is movable between a first contact and a second contact, the bars of said machines being selectively responsive to a predetermined group of pulses received by the corresponding magnets to cause said bars to close their first contacts, said bars being connected to each other, and means to indicate the failure of said bars to close their first contacts, said means including an indicator connecting said first contacts with said second contacts.

10. The combination of two devices each having a control magnet and a plurality of bars each of which is movable between a first contact and a second contact, each bar of one of said devices being electrically connected to the corresponding bar of the other device, a first conductor interconnecting all of the first contacts of both devices, a second conductor interconnecting all of the second contacts of both devices, and an indicator connected between said first and second conductors, said devices being responsive to the pulses of a single predetermined teletypewriter signal simultaneously impressed upon both control magnets to cause only one of the bars in each device to be selected to open the second contact and close its first contact, whereby the indicator will indicate whether or not the selected bars have operated properly.

11. The combination of a single source of pulses corresponding to teletypewriter characters, two non-typing selectors connected to said source, each non-typing selector having a plurality of pull bars controlled by a magnet, each pull bar being selected by said magnet in response to the pulses corresponding to a predetermined teletypewriter character so as to open a first contact and to close a second contact, a first conductor connecting all of said first contacts to each other, a second conductor connecting all of said second contacts to each other, the pull bars of one of said selectors being connected to the corresponding pull bars of the other of said selectors, and indicating means interconnecting said first conductor with said second conductor and responsive to a failure of one of said pull bars to close its second contact upon receipt of the pulses of a corresponding teletypewriter character.

12. The combination of a teletypewriter transmitter-distributor, a plurality of non-typing selectors each having an operating magnet connected to said transmitter-distributor and a plurality of swingers controlled by said operating magnet to move said swingers selectively from a first contact to a second contact, the swingers of one of said selectors being connected to the corresponding swingers of each of the other selectors, a first conductor interconnecting all of said first contacts of all of said selectors, a second conductor interconnecting all of the second contacts of all of said selectors, a control circuit connected between said first conductor and said second conductor, and means responsive to the completion of said control circuit to cause said transmitter-distributor to cease operating.

ARLO RALEIGH EGGENSPERGER.